United States Patent
Normand (10) Patent No.: US 9,457,328 B2
(45) Date of Patent: Oct. 4, 2016

(54) KNEADING DEVICE FITTED WITH A SHAFT RETENTION DEVICE

(71) Applicants: HERAKLES, Le Haillan (FR); CENTRE NATIONAL D'ETUDES SPATIALES CNES, Paris (FR)

(72) Inventor: Frédéric Normand, Saint Medard en Jalles (FR)

(73) Assignees: HERAKLES, Le Haillan (FR); CENTRE NATIONAL D'ETUDES SPATIALES CNES, Paris (FR)

( * ) Notice: Subject to any disclaimer, the term of this patent is extended or adjusted under 35 U.S.C. 154(b) by 0 days.

(21) Appl. No.: 14/439,308

(22) PCT Filed: Oct. 28, 2013

(86) PCT No.: PCT/FR2013/052573
§ 371 (c)(1),
(2) Date: Apr. 29, 2015

(87) PCT Pub. No.: WO2014/068234
PCT Pub. Date: May 8, 2014

(65) Prior Publication Data
US 2015/0298079 A1 Oct. 22, 2015

(30) Foreign Application Priority Data
Oct. 30, 2012 (FR) ..................................... 12 02924

(51) Int. Cl.
*B01F 7/08* (2006.01)
*B29C 47/08* (2006.01)
*B01F 15/00* (2006.01)

(52) U.S. Cl.
CPC .............. *B01F 7/082* (2013.01); *B01F 7/083* (2013.01); *B01F 7/085* (2013.01);
(Continued)

(58) Field of Classification Search
CPC ................... B01F 15/00922; B01F 15/00694; B01F 15/00714; B01F 2015/0011; B29C 47/0803; B29C 47/0808; B29C 47/0801
USPC ....... 366/69, 79–90, 331; 425/204, 208, 209
See application file for complete search history.

(56) References Cited

U.S. PATENT DOCUMENTS

| 209,195 A | 10/1878 | Seachrist | |
|---|---|---|---|
| 2,466,888 A * | 4/1949 | Garraway | F04C 2/16 366/301 |

(Continued)

FOREIGN PATENT DOCUMENTS

| EP | 0 464 816 A1 | 1/1992 | |
|---|---|---|---|
| EP | 2662195 A1 * | 11/2013 | ......... B29C 47/0801 |

OTHER PUBLICATIONS

International Search Report as issued in International Patent Application No. PCT/FR2013/052573, dated Feb. 17, 2014.

(Continued)

*Primary Examiner* — Charles Cooley
(74) *Attorney, Agent, or Firm* — Pillsbury Winthrop Shaw Pittman LLP (57) ABSTRACT

A paste kneading device includes an oblong barrel, two shafts arranged parallel within the barrel, being held and driven at their first ends, defining an upstream end, by a drive device, two screws each formed by threads carried by the shafts, each screw having a transport section carrying a main thread to cause the paste to advance along the two screws, and an outlet orifice formed in the wall of the barrel to discharge the kneaded paste, the kneading device further including a holder device to hold each shaft at its second end, defining a downstream end, and enabling the shaft to rotate freely, the holder device including, for each shaft, a first portion secured to the shaft and a second portion secured to a cap end portion of the barrel, the cap end portion being removable and the first and second portions being configured to engage and disengage freely.

9 Claims, 4 Drawing Sheets

(52) U.S. Cl.
CPC .. *B01F 15/00714* (2013.01); *B01F 15/00922* (2013.01); *B29C 47/0803* (2013.01); *B29C 47/0808* (2013.01); *B01F 2015/0011* (2013.01); *B01F 2015/00084* (2013.01)

(56) References Cited

U.S. PATENT DOCUMENTS

| | | | | |
|---|---|---|---|---|
| 3,068,051 | A | 12/1962 | Koch | |
| 3,198,491 | A * | 8/1965 | Loomans | B29B 7/488 366/77 |
| 3,239,878 | A * | 3/1966 | Ahlefeld, Jr. | A21C 1/06 366/194 |
| 3,447,582 | A * | 6/1969 | Street | B01J 10/02 159/2.2 |
| 3,553,777 | A * | 1/1971 | Fritsch | B29C 47/0805 366/149 |
| 3,764,118 | A * | 10/1973 | Matsuoka | B29C 47/082 366/321 |
| 3,776,529 | A * | 12/1973 | Sutter | B01F 11/0057 366/78 |
| 3,802,670 | A * | 4/1974 | Okada | B29B 7/488 366/321 |
| 4,380,397 | A * | 4/1983 | Hashizume | B29B 7/465 366/7 |
| 4,600,311 | A * | 7/1986 | Mourrier | B29C 47/0822 366/322 |
| 4,744,669 | A * | 5/1988 | Kowalczyk | B29B 7/48 222/413 |
| 4,752,135 | A * | 6/1988 | Loomans | B29B 7/482 366/297 |
| 4,875,847 | A * | 10/1989 | Wenger | B30B 11/243 264/211.21 |
| 5,409,366 | A * | 4/1995 | Vincent | A21C 11/20 264/211.23 |
| 6,390,666 | B1 * | 5/2002 | Schafer | B29C 47/0808 277/527 |
| 6,523,997 | B1 * | 2/2003 | Cotteverte | B29C 47/0808 277/370 |
| 2002/0057626 | A1 * | 5/2002 | Schafer | B29B 7/488 366/331 |
| 2014/0271969 | A1 * | 9/2014 | Dispenza | B29B 47/50 425/226 |
| 2015/0298079 | A1 * | 10/2015 | Normand | B01F 7/083 366/84 |

OTHER PUBLICATIONS

Written Opinion of the International Searching Authority as issued in International Patent Application No. PCT/FR2013/052573, dated May 5, 2015.

* cited by examiner

KNEADING DEVICE FITTED WITH A SHAFT RETENTION DEVICE

CROSS REFERENCE TO RELATED APPLICATIONS

This application is the U.S. National Stage of PCT/FR2013/052573 filed Oct. 28, 2013, which in turn claims priority to French Application No. 1202924, filed Oct. 30, 2012. The contents of both applications are incorporated herein by reference in their entirety.

FIELD OF THE INVENTION

The present description relates to a paste-kneading device for kneading and extruding a paste in reliable and stabilized manner, while providing ease of maintenance.

Such a device may be used in particular for extruding dangerous materials, in particular pyrotechnic materials, in safe manner. In particular, it enables the device to be maintained easily and safely between stages of production.

STATE OF THE PRIOR ART

In numerous industrial fields (plastics, agrifood business, papermaking, etc.), extrusion methods now commonly make use of extruders of the twin-screw type.

Twin-screw extruders comprise two meshing screws rotating in the same direction in a stationary cavity referred to as a barrel. They serve to mix various ingredients, to knead the paste as obtained in this way, and to push it towards an outlet where a die may be arranged to shape the paste as extruded in this way.

In such twin-screw extruders, each screw is held and driven at one of its ends, while its other end is free. The paste thus advances towards the free end of each of the screws, with the outlet being provided in line therewith. In such a configuration, since the screws are not fastened to the barrel, it is possible during maintenance or cleaning to decouple the barrel from the machine for driving the screws and to extract the barrel completely, along the axes of the screws, in order to reveal the screws and in order to make it easy for a technician performing cleaning and maintenance of the screws to intervene.

Nevertheless, in numerous applications, the screws can be rather long: and since they are held at one end only, they can present a degree of instability at their free ends under the effects of gravity, rotary meshing, or forces associated with kneading and transporting the paste.

In order to avoid such instability, which can become very problematic or even dangerous in certain industrial applications such as producing propellants or explosives and extruding dangerous materials in general, novel twin-screw extruders have been devised in which each screw is held at both ends.

Nevertheless, in that novel configuration, one end of each screw is fastened to the barrel, thereby preventing the barrel from being separated from the remainder of the device in order to reveal the screws and enable a technician to act on them. Instead of that, known solutions consist in constructing the barrel in the form of two half-shells that are hinged together: during maintenance or cleaning, the top half-shell can thus be opened on one side like a sarcophagus, using hinges on the other side, or else it can be opened at one end using distal hinges like a pair of jaws in order to give access to the inside of the barrel.

Unfortunately, such incomplete opening presents numerous drawbacks. Firstly, naturally, only the top half of each screw is revealed: cleaning of the bottom portions of the screws is made more complex since the screws are always housed in the bottom half-shell of the barrel where the bottom halves are difficult to access. In addition, when the barrel is open, the top half-shell is cantilevered out on the hinges of the barrel, thereby leading to instability and running the risk of damaging the equipment and injuring the technician.

It can thus be understood that there exists a real need for a paste-kneading device that enables a paste to be kneaded and extruded in reliable and stable manner, while also being easy and safe to maintain.

SUMMARY OF THE INVENTION

The present description relates to a device for kneading a paste, the device comprising an oblong barrel, two shafts arranged parallel within the barrel, being held and driven at their first ends, defining an upstream end, by means of a drive device, and two screws, each formed by threads carried by the shafts, each screw having at least one transport section carrying a main thread to cause the paste to advance along the two screws, and an outlet orifice formed in the wall of the barrel to discharge the kneaded paste. It further comprises a holder device configured to hold each shaft at its second end, defining a downstream end, and enabling the shaft to rotate freely, the holder device comprising, for each shaft, a first portion secured to said shaft and a second portion secured to a cap end portion of the barrel, the cap end portion being removable and said first and second portions being configured to engage and disengage freely.

In this description, the first ends of the barrel, of the shafts, and of the screws are situated beside the drive device and they define the upstream end of the kneading device; the second ends of the barrel, of the shafts, and of the screws are situated beside the holder device, i.e. remote from the drive device, thereby defining the downstream end of the kneading device. The paste advances from upstream to downstream along the kneading device.

The principle on which this kneading device operates is analogous to that of the above-mentioned prior art twin-screw extruders. Nevertheless, because of the holder device that enables the second end of each shaft to be held while still allowing it to rotate freely, each of the screws is better controlled both in position and in motion over the entire length of the screw. Consequently, unwanted movements and induced vibration are reduced. Extrusion takes place in a manner that is more stable and regular, and the quality of kneading is not degraded. Friction is also reduced: this avoids the paste being heated while it is being extruded. In particular, this absence of heating and of jolts limits any risk of a pyrotechnic incident while kneading explosive materials.

In addition, in so far as the portions of the holder device that are secured respectively to the screws and to the cap end portion can be separated freely from each other, it suffices to disassemble the cap end portion in order to decouple the barrel from the machine. Under such circumstances, it becomes possible to extract the barrel completely along the axis of the screws via their ends that have been released in this way, so as to reveal the screws completely, and thus enable intervention to be performed freely over the entire surface of each screw from any angle of approach. In particular, it is much easier to clean the screws. Furthermore, apart from the cap end portion that has been removed, this configuration enables the barrel to retain its cohesion during maintenance and it enables the technician to work under conditions that are safer: the above-mentioned drawbacks associated with opening the barrel made of two half-shells are avoided.

Furthermore, the screw holder system thus enables the set of screws to be moved longitudinally relative to the barrel assembly, thus making it possible to mitigate the effects of elongation during periods of work, in particular as a result of temperature changes.

In certain embodiments, the first portion of the holder device is a cylindrical sleeve fastened to the second end of said shaft, extending the shaft at least in part, and thus forming a cavity on the axis of said shaft, the second portion of the holder device is a spindle secured to the cap end portion of the barrel (also referred to as a "lantern") and penetrating into said cavity on the axis of said shaft. The holder device further includes a roller bearing system housed in said cavity enabling the cylindrical sleeve to rotate on the spindle. This configuration enables each shaft to be held in line therewith without using a circumferential bearing that would be bulky and poorly adapted to this particular application. In addition, the ability of the cap end portion to be removed and the specified arrangement of the holder device thus provided in line with the shafts, provide ease of installation, and enable disassembly intervention to take place quickly. The holder device as such also constitutes the subject matter of the present description. It is not limited to the application described herein but could be used in any other machine possessing a shaft that it is desired to hold at one end.

In certain embodiments, each screw is also formed by threads carried by at least one segment of the cylindrical sleeve. In this way, the working length of each screw is lengthened and may correspond to the total length of the assembly made up of the shaft and the sleeve. As a result, the length occupied by the sleeve is not lost.

In certain embodiments, each cylindrical sleeve is fastened on its shaft by means of a nut fastened to said second end of said shaft. This makes assembly easier and avoids unwanted separation of the sleeve, e.g. as a result of rotary drive forces or as a result of kneading the paste.

In certain embodiments, the cap end portion includes holes on the axes of said shafts in which the spindles engage in order to penetrate into their respective cavities, and each spindle has a heel that is fastened to the outside surface of the cap end portion of the barrel. Assembly and disassembly are thus made easier and can be performed from the end of the kneading device, thus providing great ease of access and of intervention.

In other embodiments, the cap end portion of the barrel has cutouts on the axes of said shafts in which the spindles engage and are blocked in order to penetrate into their respective cavities. This avoids making any holes in the cap end portion in line with the shafts and ensures that the spindles are locked in position merely by being covered by the cap end portion and by it being mounted on the main portion of the barrel.

In certain embodiments, the spindles form integral portions of the cap end portion of the barrel and they are arranged on the axes of said shafts so as to penetrate into their respective cavities. This avoids any holes or cutouts in the cap end portion and avoids any spindle-fastening operation, the spindles naturally being secured to the cap end portion.

In certain embodiments, said cap end portion of the barrel (also referred to as a "lantern") is a single-piece part. This further facilitates disassembly and intervention on the holder device in the event of a problem.

In certain embodiments, the holder device further comprises, for each shaft, a shield arranged at the inlet of the cavity between the cylindrical sleeve and the spindle in order to seal the cavity and protect the bearing system.

In certain embodiments, said outlet orifice is formed in the lateral wall of the barrel in order to discharge the kneaded paste, and the kneading device further includes a blocking arrangement for blocking advance of the paste and causing it to leave via the lateral outlet orifice.

Insofar as the region of the second ends of the screws is occupied by the holder device, a lateral outlet orifice is provided in the lateral wall of the barrel in order to discharge the kneaded paste. In this way, the paste leaves laterally before the end of the screw so as to avoid jamming or damaging the holder device.

Because of this blocking arrangement, advance of the paste is obstructed so that it may escape preferentially via the lateral outlet orifice. In this way, the paste is prevented from continuing its path towards the second ends of the screws and thus towards the holder device, which it might damage. Such a blocking arrangement may be in the form of a contrarotating section with thread in the opposite direction to the main thread, or indeed in the form of a gasket preventing the paste from advancing beyond said gasket. It may also be a stop section forming a stop abutment for the paste within the barrel or an interruption section that is smooth and that does not have any thread.

In certain embodiments, the cap end portion of the barrel includes at least one lateral opening. This lateral opening is useful in particular for discharging any excess paste and thus makes it possible to limit the accumulation of paste that might potentially give rise to pyrotechnic incidents. It also makes it possible to limit the occurrence of clogging that might potentially damage the kneading device, and in particular the holder device.

In certain embodiments, said lateral opening is arranged in the bottom surface of the cap end portion of the barrel. In this way, excess paste falls under gravity out from the barrel and is thus discharged.

In certain embodiments, a container is placed under this lateral opening in order to collect the excess paste as discharged in this way. The container may be fastened in releasable manner to the cap end portion of the barrel.

In certain embodiments, a video system, in particular a camera, may be arranged under the cap end portion of the barrel facing towards said lateral opening in order to observe whether any excess paste is present at the holder device. The video system may be fastened to the cap end portion of the barrel.

In certain embodiments, a lateral opening is arranged in the top surface of the cap end portion of the barrel. In this way, it is possible to check visually whether any excess paste is present at the holder device.

The above-mentioned characteristics and advantages, and others, appear on reading the following detailed description of embodiments of the proposed device. This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified by the same reference signs.

DETAILED DESCRIPTION OF EMBODIMENTS

In order to make the invention more concrete, example devices are described in detail below with reference to the accompanying drawings. It should be recalled that the invention is not limited to these embodiments.

Figure 1:
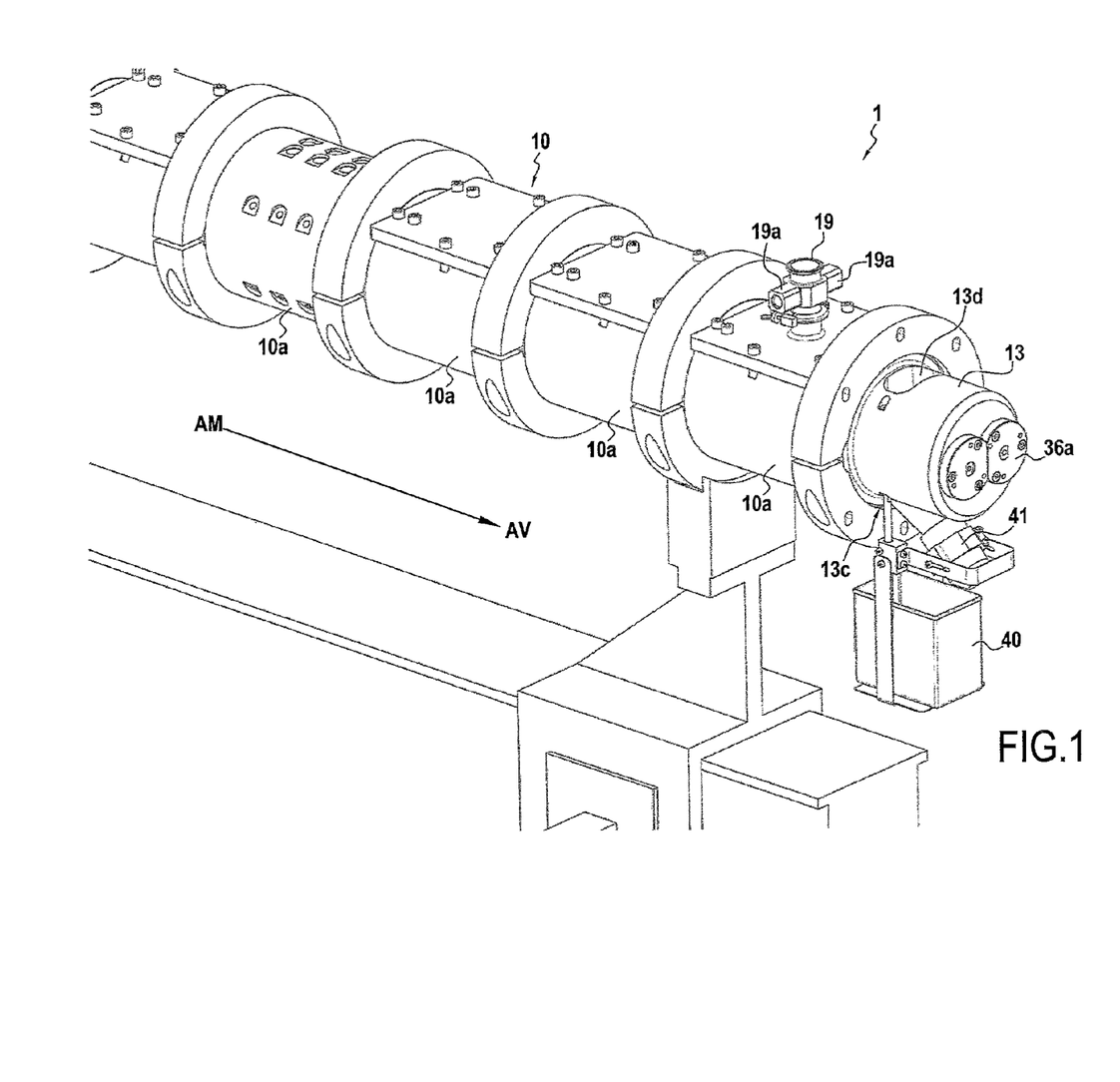
FIG. 1 is an overall perspective view of a first embodiment of the device.

FIG. 1 shows a first embodiment of a kneading device 1 of the invention. The same kneading device 1 is shown diagrammatically in section in FIG. 2.

Figure 2:
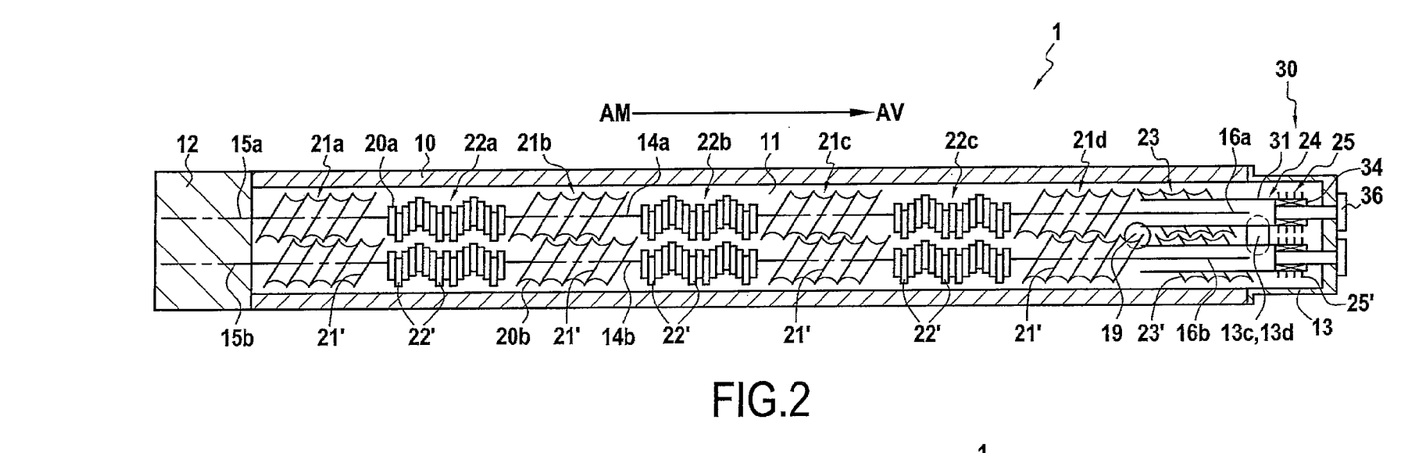
FIG. 2 is a diagrammatic section view of the FIG. 1 device.

The kneading device 1 comprises an oblong barrel 10 that is substantially cylindrical. It may be made up of a plurality of segments 10a that are connected to one another. Internally, the barrel 10 defines a recess 11 having a cross-section plane that is substantially 8-shaped, the first and second loops of the 8-shape corresponding respectively to first and second chambers 11a and 11b of the recess 11 that are in communication with each other. The barrel 10 is closed at its first end, defining an upstream end AM, by a drive unit 12 containing a drive device, and at its second end, defining a downstream end AV, by a cap end portion 13 also referred to as a "lantern".

Each chamber 11a, 11b receives a screw 20a, 20b carrying various types of thread. In this embodiment, from upstream AM to downstream AV, each screw 20a, 20b has a first transport section 21a, a first kneading section 22a, a second transport section 21b, a second kneading section 22b, a third transport section 21c, a third kneading section 22c, a fourth transport section 21d, a contrarotating section 23, an interruption section 24, and finally a barrier section 25.

The transport sections 21 are provided with helical threads 21' said to be "main" threads, having a main pitch and a main direction, specifically a counterclockwise direction. The kneading sections 22 are provided with a series of eccentric disks 22'; these disks 22' are eccentric relative to the axis of the screw 20a, 20b and also among one another, at least between eccentric disks 22' that are adjacent. The contrarotating section 23 (there may nevertheless be more than one) is provided with a "contrarotating" helical thread 23' of direction opposite to the main direction, specifically the contrarotating thread 23' is clockwise; it may be of any pitch and in particular its pitch may be equal to the main pitch or it may be smaller, for example. The interruption section 24 (there may nevertheless be more than one) is smooth and without thread: its diameter is preferably equal to the minor diameter of the screw (i.e. the diameter at the roots of its thread). Finally, the barrier section 25 (there may nevertheless be more than one) is provided with a series of annular rings 25'.

The screws 20a and 20b are arranged parallel so that each section 21 to 25 of the first screw 20a faces a corresponding section 21 to 25 of the second screw 20b. In addition, some of the sections of the screws 20a and 20b, and in particular the transport sections 21, the kneading sections 22, and the contrarotating section, intermesh with each other. That is why the threads of the transport and contrarotating sections 21 and 23 are offset a certain amount at any given position between the two screws 20a and 20b. In contrast, there is no such offset for the kneading sections 22 so that the projections from the kneading sections 22 of the first screw 20a engage in the recesses of the kneading sections 22 of the second screw 20b.

The shape of each chamber 11a, 11b is substantially cylindrical on a circular base, the cylinder being truncated at the passage providing communication between the two chambers 11a and 11b. In addition, ignoring a small amount of clearance, its diameter corresponds to the major diameter (i.e. the diameter at the crests of the threads) of the various threads of the screws 20a, 20b such that the screws 20a, 20b are flush with the inside walls of their respective chambers 11a, 11b, at least in their threaded sections 21 and 23.

The chambers 11a and 11b open to the outside via a lateral outlet orifice 19 in the surface of the barrel 10. This orifice is in the form of a duct projecting from the top of the barrel 10. It presents lateral channels 19a to receive sensors, if any. This lateral outlet orifice 19 is arranged substantially at the transition between the last transport section 21d and the contrarotating section 23.

The chambers 11a and 11b also open to the outside via two lateral openings 13c and 13d formed in the lantern 13 of the barrel. The first lateral opening 13c is arranged in the bottom surface of the lantern 13; the second lateral opening 13d is arranged in the top surface of the lantern 13 facing the first lateral opening 13c. These lateral openings are substantially level with the interruption sections 24 of the screws 20a and 20b. In certain embodiments, the barrel 10 need not have a lateral outlet orifice as described above: under such circumstances, the kneaded paste can escape via one of the lateral openings 13c, 13d.

Each screw 20a, 20b is carried in a downstream portion by a fluted shaft 14a, 14b, and in a downstream portion, by a sleeve 31 that extends said shaft 14a, 14b and that is described in detail below. The first end 15a, 15b of each shaft 14a, 14b is driven in rotation in synchronized manner in the same direction and at the same speed by the drive device 12 so that the screws 20a and 20b mesh correctly and do not jam. In this example, the shafts 14a and 14b are driven clockwise.

The second end 16a, 16b of each shaft 14a, 14b is held by a holder device 30: this device allows the shafts 14a and 14b to rotate freely when they are driven by the drive device 12.

Figure 3:
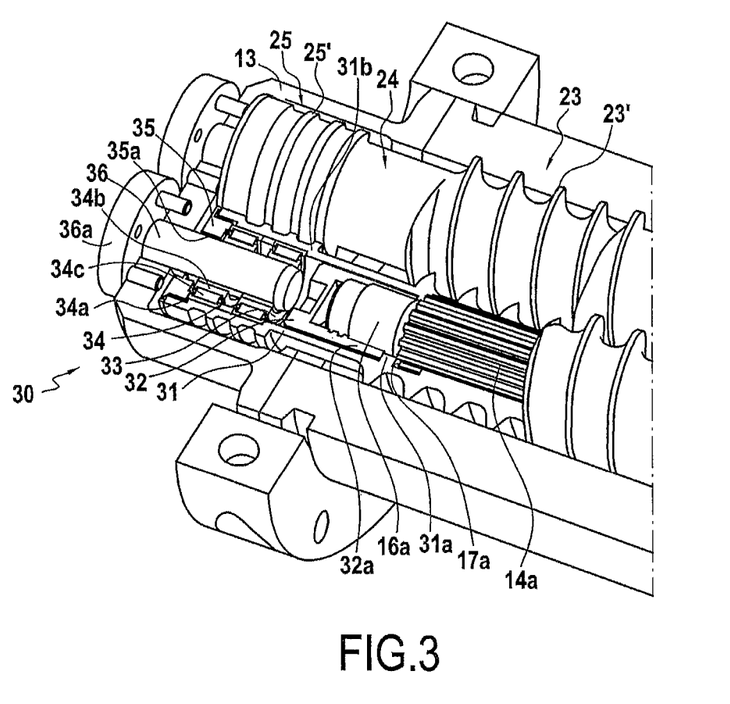
FIG. 3 is a detail view in perspective and partially in section of the holder device zone of the FIG. 1 embodiment of the device.

The holder device 30 is shown in greater detail in FIG. 3. It is identical for each of the shafts 14a and 14b: as a result, only the holder device for the first shaft 14a is described.

It comprises a sleeve 31 engaged on the second end 16a or 16b of each of the fluted shafts 14a or 14b. The sleeve 31 has an annular internal rim 31a that bears against a shoulder 17a at the second end 16a of the shaft 14a such that the sleeve 31 is held in its operating position. A nut 32 is screwed onto the threaded second end 16a of the shaft 14a in such a manner that the heel 32a of the nut 32 bears against the rim 31a of the sleeve 31 and blocks it against the shoulder 17a of the shaft 14a: the sleeve 31 is thus secured to the fluted shaft 14a and thus rotates therewith when it is driven in rotation by the drive device 12.

Engaged in this way, the sleeve 31 extends the shaft 14a, thereby defining a cavity 33 on the axis of the shaft 14a. This cavity 33 receives a rolling bearing system 34, e.g. a roller bearing, pressed against an internal shoulder 31b of the sleeve 31. The bearing system 34 has an outer ring 34a secured to the sleeve 31 and an inner ring 34b rotatable freely concentrically within the outer ring 34a via rollers 34c. A shield 35 is arranged at the inlet to the cavity 33 and holds the outer ring 34a of the bearing system 34 against the shoulder 31b of the sleeve 31. This shield 35 protects the cavity 33 leaving only one opening 35a that is occupied by a spindle 36.

The cap end portion 13 of the barrel 10, or "lantern", is fastened to the main portion of the barrel 10 by securing means that enable the lantern 13 to be mounted and removed easily. It is provided with two holes 13a, 13b, each of which lies on the axis of one of the shafts 14a and 14b. The spindle 36 penetrates into the cavity 33 through the hole 13a in the lantern 13, the opening 35a in the shield 35, and the inner ring 34b of the bearing system 34. The heel 36a of the spindle 36 is fastened against the outside surface of the lantern 13 while the spindle 36 is secured to the inner ring 34b of the bearing system. The spindle 36 is thus stationary relative to the lantern 13 and to the barrel 10, and the sleeve 31 can rotate freely about the spindle 36 so that the second end 16a of the shaft 14a is held by the holder device 30.

In addition, in this embodiment, the sleeve 31 carries the contrarotating section 23, the interruption section 24, and the barrier section 25.

The operation of the device 1 is described in detail below with reference to FIGS. 1 to 3.

The components of the paste that is to be extruded are introduced into the barrel 10 of the device 1 via an admission opening (not shown). They may be subjected to a measuring-out and pre-mixing step. They may also be associated with a binder so as to obtain a paste that is suitable for being kneaded by the device 1.

Throughout the operation, the shafts 14a and 14b are driven in rotation, in synchronized manner and at constant speed. The direction of rotation in this example is clockwise. The paste is thus driven from upstream to downstream from the admission opening towards the lateral outlet orifice 19.

The transport sections 21 drive the paste downstream using the Archimedes' screw mechanism. The paste is also sheared and thus already kneaded to some extent in the meshing zones of the thread 21' of the transport sections 21.

The kneading sections 22 receive the paste thrust in by the transport section 21 situated upstream: the paste is kneaded between the various eccentric disks 22' of the two screws 20a and 20b and between these disks and the walls of the chambers 11a and 11b. The paste advances along the kneading sections 22 under pressure from paste upstream under thrust from the transport sections 21.

At the end of the last transport section 21d, the paste meets the contrarotating section 23 in which the contrarotating threads 23' tend to push it back upstream. Under the effect of these two opposing forces, the paste is pushed towards the lateral outlet orifice 19 located in this zone. The paste is then extruded and recovered by appropriate conveyor means. A die may be located at the lateral outlet orifice 19 so as to shape the extruded paste, e.g. in the form of a section member of given shape.

Assuming that the pressure of the upstream paste is too strong and/or that the lateral outlet orifice 19 is blocked or obstructed, the paste might manage to advance along the contrarotating section in spite of the reverse thread 23'. Under such circumstances, the paste ends up in the interruption section 24 from which it escapes via the first lateral opening 13c: excess paste thus drops under gravity into a container 40 arranged under the lantern 13, vertically under the first lateral opening 13c. A camera 41 is also arranged under the lantern 13 in order to look through the first lateral opening 13c and detect whether any such excess paste is present. The second lateral opening 13d enables visual inspection to be made by an operator.

The absence of thread and the smooth nature of the interruption section 24 serve to reduce adhesion of the paste on the screws 20a and 20b, thereby encouraging it to drop out from the barrel 10. Nevertheless, if the paste remains stuck to the screws 20a and 20b, the rings 25' of the barrier section 25 prevent the paste from advancing any further and jamming the holder device 30 or leading to an accumulation of paste that might lead to a pyrotechnic incident. Finally, the shields 35 constitute a final line of defense for protecting the bearing system 34 and avoiding paste penetrating therein and jamming it.

Figure 4:
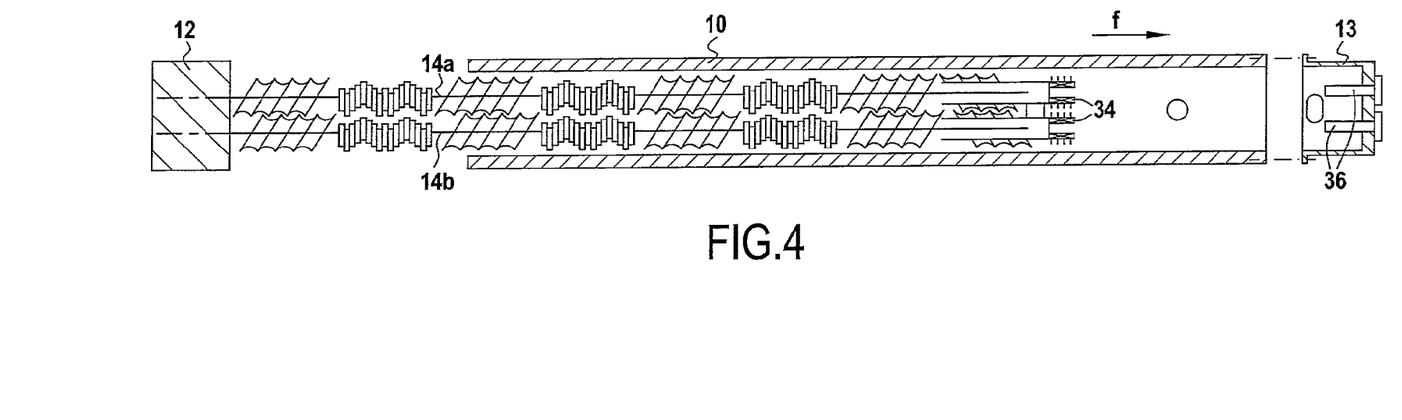
FIG. 4 is a diagrammatic section view of the FIG. 1 device during disassembly.

Between stages of production, the barrel 10 may be removed entirely so as to enable the kneading device to be cleaned: this operation is shown in FIG. 4. In the embodiment shown, it is appropriate to remove the lantern 13 in order to separate it from the remainder of the barrel 10. Because of the holder device 30 having a sleeve 31 that rotates freely on a spindle 36 secured to the lantern 13, separation and removal of the lantern 13 is not impeded by the holder device 30: the spindles 36 can be disengaged from their respective sleeves 31 simply and naturally while the lantern 13 is being withdrawn. Under such circumstances, the barrel 10 is entirely separate from the screws 21 and can therefore be detached from the drive device 12 and slid (in the direction of arrow f) all along the outsides of the screws 21 so as to end up being completely removed via the downstream end AV of the device.

That said, because of this architecture for the holder device 30 in which the set of screws 20a, 20b disengages freely from the barrel assembly 10, it is possible in other embodiments to separate this set of screws 20a, 20b from the barrel assembly 10 and to extract the barrel so as to enable maintenance and cleaning to be performed without a prior step of removing the lantern 13.

Once the barrel 10 has been withdrawn, the screws 21 are fully revealed, which makes intervention easy for a technician performing cleaning or maintenance of the device.

Figure 5:
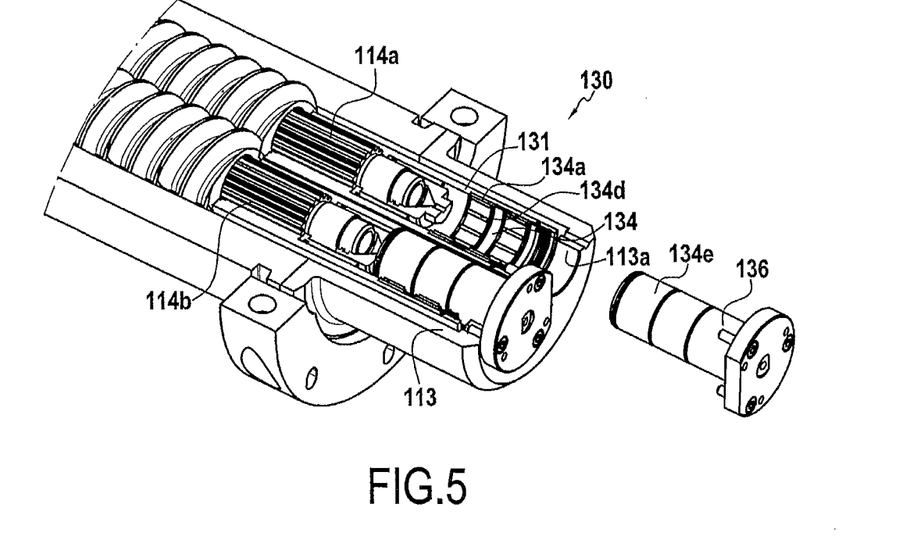
FIG. 5 is a detail view in perspective and partially in section showing the holder device zone of a second embodiment of the device.

FIG. 5 shows a second embodiment of a device 100 of the invention. Only the differences relative to the first embodiment are described. In addition, elements (or portions of an element) in this embodiment having functions that are analogous to those already described are identified in the figures by the same numerical references plus 100.

In this embodiment, the bearing system 134 is different. It still has an outer ring 134a secured to the sleeve 131, but it no longer has an inner ring: the rollers are replaced by needles 134d that roll on a running track 134e of the spindle 136. In addition, the spindle 136 is of greater diameter, thereby requiring holes 113a and 113b of larger diameter in the lantern 113.

Figure 6:
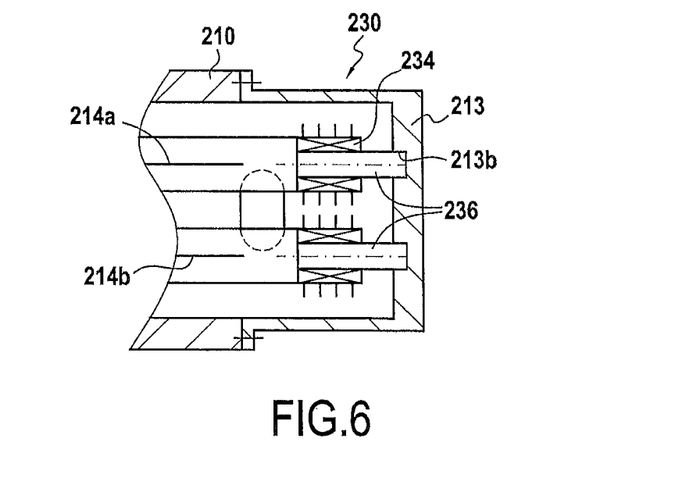
FIG. 6 is a diagrammatic view of the holder device zone of a third embodiment of the device.

FIG. 6 shows a third embodiment of a device 200 of the invention. Only the differences relative to the first embodiment are described. In addition, elements (or element portions) of this embodiment that have functions that are analogous to those described above are identified in the figures by the same numerical references plus 200.

In this embodiment, the lantern 213 does not have through holes for the spindles 236, but merely has cutouts 213b formed in the inside surface of the lantern 213, each cutout being on the same axis as a corresponding one of the shafts 214a and 214b. These cutouts 213b also have the same shape and the same dimensions as the ends of the spindles 236 so that it is possible to fasten said spindles 236 therein as force-fits, thereby securing them to the lantern 213. The spindles 236 are then appropriately positioned to penetrate into the bearing system 234 of the holder device 230. It is also possible to weld the spindles directly to the inside surface of the lantern 213 or indeed to form the spindles and the lantern as a single part.

The embodiments described in the present description are given by way of non-limiting illustration, and, in the light of this description, a person skilled in the art can easily modify these embodiments or can envisage others, while remaining within the ambit of the invention.

Furthermore, the various characteristics of these embodiments may be used singly or they may be combined with one another. When they are combined, these characteristics may be combined as described above or in other ways, the invention not being limited to the specific combinations described in the present description. In particular, unless specified to the contrary, a characteristic that is described with reference to any one embodiment may be applied in analogous manner to another embodiment.

The invention claimed is:

1. A device for kneading a paste, the device comprising:
an oblong barrel;
two shafts arranged parallel within the barrel, being held and driven at their first ends, defining an upstream end, by a drive device;
two screws each formed by threads carried by the shafts, each screw having at least one transport section carrying a main thread to cause the paste to advance along the two screws;
an outlet orifice formed in a wall of the barrel to discharge the kneaded paste; and
a holder device configured to hold each shaft at its second end, defining a downstream end, and enabling the shaft to rotate freely, the holder device comprising, for each shaft, a first portion secured to said shaft and a second portion secured to a cap end portion of the barrel, the cap end portion being removable and said first and second portions being configured to engage and disengage freely;
wherein, for each shaft:
the first portion of the holder device is a cylindrical sleeve fastened to the second end of said shaft, extending the shaft at least in part, and thus forming a cavity on the axis of said shaft;
the second portion of the holder device is a spindle secured to the cap end portion of the barrel and penetrating into said cavity on the axis of said shaft; and
the holder device further includes a roller bearing system housed in said cavity enabling the cylindrical sleeve to rotate on the spindle.

2. A kneading device according to claim 1, wherein each screw is also formed by threads carried by at least one segment of the cylindrical sleeve.

3. A kneading device according to claim 1, wherein each cylindrical sleeve is fastened on its shaft by a nut fastened to said second end of said shaft.

4. A kneading device according to claim 1, wherein the cap end portion of the barrel includes holes on the axes of said shafts in which the spindles engage in order to penetrate into their respective cavities, and wherein each spindle has a heel that is fastened to the outside surface of the cap end portion of the barrel.

5. A kneading device according to claim 1, wherein the cap end portion of the barrel has cutouts on the axes of said shafts in which the spindles engage and are blocked in order to penetrate into their respective cavities.

6. A kneading device according to claim 1, wherein said cap end portion of the barrel is a single-piece part.

7. A kneading device according to claim 1, wherein the holder device further comprises, for each shaft, a shield arranged at the inlet of the cavity between the cylindrical sleeve and the spindle in order to seal the cavity and protect the bearing system.

8. A kneading device according to claim 1, wherein said outlet orifice is formed in the lateral wall of the barrel in order to discharge the kneaded paste; and
wherein the kneading device further includes a blocking arrangement for blocking advance of the paste and causing the paste to leave via the lateral outlet orifice.

9. A kneading device according to claim 1, wherein the cap end portion of the barrel includes at least one lateral opening.

* * * * *